Dec. 23, 1924.

M. SMITH

FEED HOPPER

Filed Feb. 19, 1924

1,520,607

Inventor
Murray Smith,
By E. Hume Talbert
Attorney

Patented Dec. 23, 1924.

1,520,607

UNITED STATES PATENT OFFICE.

MURRAY SMITH, OF SPRINGFIELD, OHIO.

FEED HOPPER.

Application filed February 19, 1924. Serial No. 693,926.

*To all whom it may concern:*

Be it known that MURRAY SMITH, a citizen of the United States of America, residing at Springfield, in the county of Clark and State of Ohio, has invented new and useful Improvements in Feed Hoppers, of which the following is a specification.

The object of the invention is to provide a device for dispensing feed to fowls and the like and of such a construction as not only to preclude wasting of the feed but to thoroughly protect the same from dirt and permit of being closed at such times as it is not desired to permit the stock to feed.

With this general object in view the invention consists in a construction and combination of parts of which a preferred embodiment is shown in the accompanying drawings, wherein:—

Figure 1:
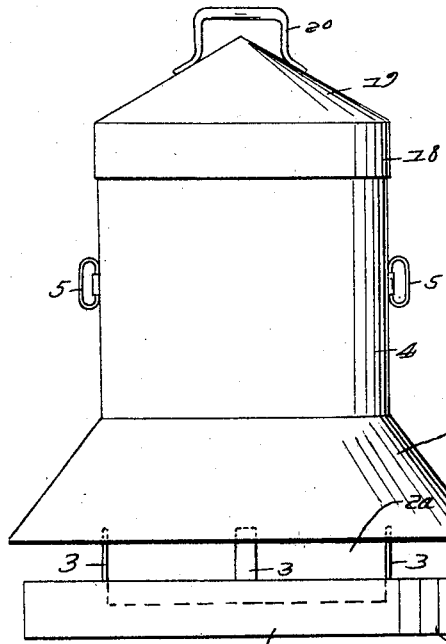
Figure 1 is a side elevational view of the invention.
Figure 2:
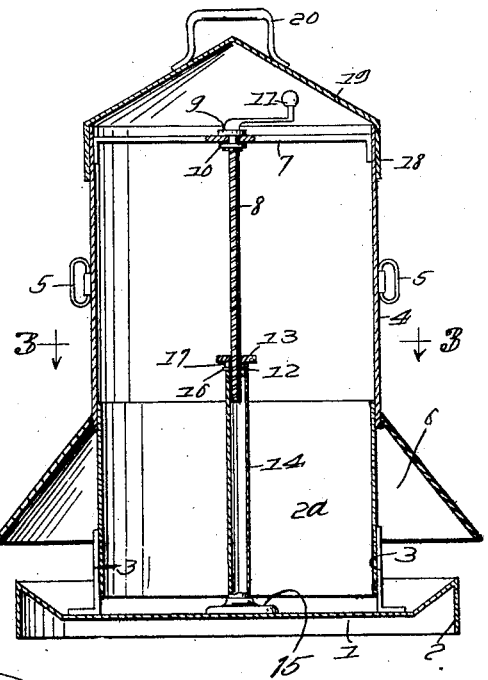
Figure 2 is a central vertical sectional view.
Figure 3:
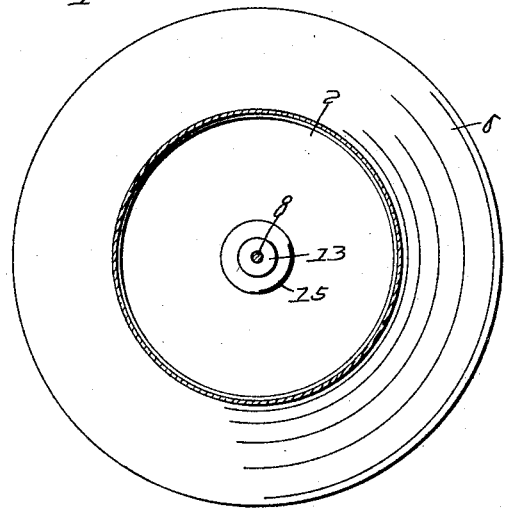
Figure 3 is a transverse sectional view on the line 3—3 of Figure 2.

The trough or pan 1 into which the feed is received is preferably provided with a depending flange 2 adjacent its periphery to support the pan well above the ground or supporting surface but not too high to permit free access to the trough by fowls or other stock feeding from the device. Carried above the pan and supported thereby there is a hopper 2ᵃ the lower edge of which is spaced from the pan or trough 1, brackets 3 serving to support the hopper and being secured to the bottom surface of the pan and the outer surface of the hopper which is preferably of tubular form. A telescoping hopper section 4, which is provided with gripping handles 5, surmounts the main hopper section 2 and carries at its lower edge a conical hood 6, the telescoping section 4 being adapted for vertical adjustment toward and away from the pan or trough 1 so as to dispose the hood in complete closing relation to the pan or to vary its height with respect to the latter so that only the heads of the fowls may reach the pan.

The telescoping section 4 is spanned at its upper edge by a diametrically disposed bar 7 with which a screw 8 is swively connected, the latter carrying collars 9 and 10 disposed respectively above and below the bar and the screw passing through a hole formed in the latter and terminating in a crank handle 11 by which rotary or turning movement may be imparted to the screw. The screw threadingly engages an internally threaded sleeve 12 which is flanged at its upper end as indicated at 13 to rest on the upper edge of a tubular column 14 which is supported by a base 15 secured in the center of the pan 1, angular or turning movement of the sleeve 12 with respect to the column 14 being prevented by a pin 16 projecting laterally from the sleeve and engaging in a slot 17 formed longitudinally of and at the upper end of the column 14. Obviously turning movement imparted to the handle will effect lowering or raising of the telescoping section 4, due to the connection between the screw and the sleeve 12 and the connection between the latter and the column 14. Thus the hood 6 may be disposed in any desired position with reference to the pan or lowered to completely close the latter and thus prevent feeding when it is so desired. In order to prevent or preclude the descent of extraneous matter into the hopper, the telescoping section 4 receives a cover or cap 18 having a conical top 19 which will preclude fowls roosting on the same and a handle 20 by which the cap or cover may be readily manipulated for removal and replacement.

The express purpose of the present invention is to provide a feed hopper, which may be used outside as well as indoors. In fact, it may remain outside irrespective of the weather conditions, as the canopy 6 extends down far enough to prevent the rain and snow from coming in contact with the feed, and at the same time making a rat and rodent proof feed apparatus. The cylindrical wall of the member 2 of the apparatus extends a substantial distance below the upper marginal edge of the pan 1, so as to insure a gradual flow of the feed.

Having described the invention, what is claimed as new and useful is:—

1. A device for the purpose indicated comprising a trough, a hopper surmounting the trough, a hopper section telescoping over the hopper and provided with a hood, a tubular column carried by the trough, a screw having a swivel connection with the telescoping hopper section and provided with a crank handle for imparting turning movement thereto, and a sleeve threadingly engaged with the screw and having a sliding connection with the column but precluded from turning movement with respect thereto.

2. A device for the purpose indicated comprising a trough, a hopper surmounting the trough, a hopper section telescoping over the hopper and provided with a hood, and a sleeve telescoped in the upper end of the column and provided with a laterally extending flange abutting the upper extremity of the column, said sleeve having a pin and slot connection with the column to preclude turning movement with respect thereto and having a threaded engagement with the screw.

3. A device for the purpose indicated comprising a trough, a hopper surmounting the trough, a hopper section telescoping over the hopper and provided with a hood, and a sleeve telescoped in the upper end of the column and provided with a laterally extending flange abutting the upper extremity of the column, said sleeve having a pin and slot connection with the column to preclude turning movement with respect thereto and having a threaded engagement with the screw, and a removable top carried by the telescoping section.

In testimony whereof he affixes his signature.

MURRAY SMITH.